(12) United States Patent
Carpigiani De Almeida et al.

(10) Patent No.: US 11,674,355 B2
(45) Date of Patent: Jun. 13, 2023

(54) SYSTEM AND METHOD FOR FORCED CIRCULATION OF FLUIDS THROUGH THE ANNULUS OF A FLEXIBLE PIPE

(71) Applicant: PETRÓLEO BRASILEIRO S.A.-PETROBRAS, Rio de Janeiro (BR)

(72) Inventors: Marcos Carpigiani De Almeida, Rio de Janeiro (BR); George Carneiro Campello, Rio de Janeiro (BR); Jonatas Ribeiro, Rio de Janeiro (BR); Rafael Guimarães De Mello Sobreira, Rio de Janeiro (BR); Walter Carrara Loureiro Junior, Rio de Janeiro (BR); Marcelo Torres Piza Paes, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 16/618,731

(22) PCT Filed: May 30, 2018

(86) PCT No.: PCT/GB2018/051463
§ 371 (c)(1),
(2) Date: Dec. 2, 2019

(87) PCT Pub. No.: WO2018/220361
PCT Pub. Date: Dec. 6, 2018

(65) Prior Publication Data
US 2020/0165878 A1 May 28, 2020

(30) Foreign Application Priority Data
May 30, 2017 (BR) ...................... 10 2017 011384-1

(51) Int. Cl.
*E21B 17/01* (2006.01)
*E21B 43/01* (2006.01)
(Continued)

(52) U.S. Cl.
CPC ............ *E21B 17/015* (2013.01); *E21B 43/01* (2013.01); *E21B 17/012* (2013.01); *E21B 19/004* (2013.01);
(Continued)

(58) Field of Classification Search
CPC ...... E21B 17/01; E21B 17/012; E21B 17/015; E21B 43/01; E21B 19/004; F16L 1/24; F16L 11/083; F16L 11/112
See application file for complete search history.

(56) References Cited

U.S. PATENT DOCUMENTS 3,299,417 A * 1/1967 Sibthorpe ............. G01M 3/283
340/605
3,972,223 A 8/1976 Torghele
(Continued)

FOREIGN PATENT DOCUMENTS

WO 2011/026801 A1 3/2011
WO 2015/087044 A1 6/2015

OTHER PUBLICATIONS

International Search Report issued in corresponding International Application No. PCT/GB2018/051463 dated Jul. 25, 2018 (5 pages).
(Continued)

*Primary Examiner* — Tara Mayo
(74) *Attorney, Agent, or Firm* — Osha Bergman Watanabe & Burton LLP (57) ABSTRACT

Pipelines with a control system and forced circulation of fluids through the annulus between an inner barrier and an outer cover of a pipe use a system configured to force circulation of fluids through the annulus. The pipe includes
(Continued)

segments (T1, T2, T3, TN) joined together by means of connectors, wherein each segment of the pipe has an injector pipe (I1, I2, I3, IN) for injecting fluid into the annulus at a first end of the segment, and a return pipe (R1, R2, R3, RN) for removing fluid from the annulus at a second end of the segment.

20 Claims, 3 Drawing Sheets

(51) Int. Cl.
*E21B 19/00* (2006.01)
*F16L 1/24* (2006.01)
*F16L 11/08* (2006.01)
*F16L 11/12* (2006.01)

(52) U.S. Cl.
CPC ............ *F16L 1/24* (2013.01); *F16L 11/083* (2013.01); *F16L 11/12* (2013.01)

(56) References Cited

U.S. PATENT DOCUMENTS

| | | | |
|---|---|---|---|
| 4,318,835 A * | 3/1982 | Clarke | C08F 220/06 523/122 |
| 5,072,622 A | 12/1991 | Roach et al. | |
| 6,171,025 B1 * | 1/2001 | Langner et al. | G01M 3/283 405/154.1 |
| 6,634,387 B1 | 10/2003 | Glejbol | |
| 2006/0188337 A1 * | 8/2006 | Webb | B67D 1/00 405/52 |
| 2008/0149209 A1 | 6/2008 | Felix-Henry | |
| 2011/0153225 A1 | 6/2011 | Mangal et al. | |
| 2013/0068464 A1 | 3/2013 | Critsinelis et al. | |
| 2013/0068465 A1 | 3/2013 | Critsinelis et al. | |

OTHER PUBLICATIONS

Written Opinion issued in corresponding International Application No. PCT/GB2018/051463 dated Jul. 25, 2018 (7 pages).

* cited by examiner

SYSTEM AND METHOD FOR FORCED CIRCULATION OF FLUIDS THROUGH THE ANNULUS OF A FLEXIBLE PIPE

CROSS-REFERENCE TO RELATED APPLICATION

This application claims the benefit of priority to BR 10 2017 011384-1, filed 30 May 2017, which is incorporated herein by reference in its entirety.

FIELD OF THE INVENTION

The present invention relates to pipeline and riser technologies. More particularly, the present invention relates to pipelines with a control system and forced circulation of fluids through the annulus of the pipeline.

BACKGROUND OF THE INVENTION

Petroleum production in the offshore environment makes wide use of ascending pipelines, known as risers. Such a pipeline, consisting of risers and the flowlines connected to them, which are fixed on the seabed, may be flexible or rigid. It has the function of collecting the oil produced by the subsea well, conveying it to a floating unit or platform, and then sending it to tankers or directly to onshore facilities. Risers and flowlines are also used for injecting gases, chemicals and other fluids from the floating unit or platform to the wells for various purposes such as stimulation of wells or storage of corrosive gases in tanks.

Flexible pipes of the "unbonded" type designed according to standards API Spec 17J and API RP 17B, the descriptions of which are incorporated herein by reference, possess armouring normally constructed of carbon steel and carbon-manganese steel, which are confined within an annulus between two permeable polymeric layers, the first layer (referred to as the "barrier") for isolating the fluid conveyed inside the pipe and the second for isolating the surroundings (referred to as the "outer cover" or "outer sheath"). That is, the barrier and outer cover can be considered to be inner and outer sheaths of the pipe. The term "annulus" is used through the present document to refer this space between the barrier and the outer cover.

The armouring is susceptible to corrosion by corrosive gases ($CO_2$ and $H_2S$) and water that permeates from inside the pipe, through the polymer of the barrier. Any loss of hermeticity of the annular space also results in the presence of water in the annulus.

Corrosion may lead to failure mechanisms, such as stress corrosion—caused by $CO_2$ or by $H_2S$—and pitting corrosion. Stress corrosion caused by $CO_2$ ($SC$—$CO_2$) is a failure mechanism that is not covered by the current versions of the international standards for flexible pipes (API Spec 17J and ISO-13628-2). The contents of standard ISO-13628-2 are also relevant and incorporated herein by reference.

At present, flexible pipes are normally constructed without an integrated system (to the pipe body and connectors) for forced circulation within the annulus between the outer cover and the barrier, which would make it possible to displace the corrosive gases that may be present in its annulus, so as to reduce their concentration or fugacity and prevent or minimize their corrosive effects.

In some cases in the oil industry, the various sections or segments of a flexible pipe, which are provided with flanges at their ends, have their annular spaces interconnected so as to allow a reduction in the concentrations of the corrosive gases. However, this conventional technical solution is not sufficient to prevent corrosion due to condensation of water in the annulus or loss of integrity of the annulus through ingress of sea water. In general, the annular space is very restricted, making circulation of the gases that have permeated and of other fluids difficult. Consequently, removal or dilution to acceptable levels of corrosive fluids also becomes difficult if forced circulation is not used or there is no change in the design features of the flexible pipe.

The flexible pipes currently on the market have layers on their annulus that make circulation of fluids difficult, and in which drops or bubbles of $CO_2$ with dissolved water may be trapped owing to the geometric characteristics both of some metallic layers (for example, "Z-shape", "T-shape" or "C-shape" layers, as illustrated in FIG. 7 of the practical recommendations API RP 17B) and in the interstices between metallic and polymeric layers, or else in elements arranged between these layers, such as anti-wear tapes or anti-buckling tapes.

Document US20130068465A1, for example, discloses a method for circulation of fluids through the annulus of a flexible riser, which requires the use of an umbilical with a pipe for allowing circulation of, for example, corrosion inhibitor in the annulus. However, that document does not provide changes in the structure of the flexible pipe or connectors necessary to allow mitigation of the problems of corrosion in the armouring of the flexible pipe, such as $SC$—$CO_2$ and pitting corrosion. The document only contemplates a single continuous riser, rather than a riser consisting of several segments.

As such, document US20130068465A1 does not consider how to mitigate corrosion in the armouring of the flexible pipe in the case of loss of hermeticity of the annulus, for example due to damage in the outer cover in an area (e.g. a particular segment, when the flexible pipe is made up of several segments). In such a scenario, the circulation would be interrupted in the area in which the annulus becomes flooded with sea water. Moreover, the method taught by US20130068465A1 requires additional support in the platform for connection of each umbilical that will allow the necessary circulation in the annulus of the riser.

Document US2011153225A1 relates to a system and method for volumetric analysis and analysis of the composition of ventilation gases and detection of water flooding in an annular space of a flexible pipe structure used in the oil and gas industry. One or more sensors are provided in line, connected to a ventilation inlet of a flexible pipe and coupled to a data recording unit using a software interface for monitoring and recording levels and types of gases produced. The level and the type of gases produced can be analysed using software for detecting whether the integrity of the pressure sheathing has been compromised, whether there is ingress of sea water into the annulus, whether the armour layer or pressure layer is corroding and whether the outer sheath has been damaged.

Thus, the proposed method and system disclosed in document US2011153225A1 serve for indirect measurement (calculations based on flow rate, pressure and temperature of the gas being vented) of the amount of water in the annulus of the flexible pipe. Since it does not mention modifications in the flexible pipe or direct or indirect interconnection of annular spaces of adjacent segments, monitoring will only take place for the first segment or single segment of the flexible pipe connected to the SPU. Moreover, said technique is limited just to monitoring, and does not envisage solutions for forced circulation of fluids in the annulus to prevent failure through stress corrosion or pitting corrosion caused by corrosive gases, such as $CO_2$ and $H_2S$.

Document WO2015087044A1 relates to a system for monitoring the annular region of a flexible pipe in real time, based on samples for the concentration of target gases in a defined region of the pipe using a sampling chamber. However, that document does not propose a methodology for preventing corrosive wear of the armour of the flexible pipe.

As will be explained in more detail below, the present disclosure addresses the aforementioned problems of the prior art in a practical and efficient manner.

SUMMARY OF THE INVENTION

The present disclosure provides a system and a method for forced circulation of fluids through the annulus of a flexible pipe capable of efficiently removing any corrosive fluids that have accumulated in the annulus of the flexible pipe.

The disclosure also provides a system and a method for forced circulation of fluids through the annulus of a flexible pipe capable of circulating fluids inside each segment of the flexible pipe independently of the others.

The disclosure also provides a system and a method for forced circulation of fluids through the annulus of a flexible pipe that allow leak tests to be performed in each segment of the flexible pipe individually, allowing damaged sections to be detected.

The disclosure also provides a system and a method for forced circulation of fluids through the annulus of a flexible pipe that allow inert fluids to be injected to remove corrosive agents from the annulus or fluids for maintenance of the tensile armour inside the annulus.

The disclosure also provides a system and a method for forced circulation of fluids through the annulus of a flexible pipe that allow sampling of fluids present inside the annulus for subsequent analysis of the quality thereof.

According to a first aspect of the invention, there is provided a system configured to force circulation of fluids through an annulus between an inner barrier and an outer cover of a pipe, the pipe being subdivided into at least two segments joined together by means of at least one connector, wherein the system comprises one or more of: for each segment of the pipe, an injector pipe configured to inject circulating fluid substantially at a first end of the annulus of the segment of the pipe, the injector pipe being in fluid communication with the annulus of the segment via an inlet point; and for each segment of the pipe, a return pipe configured to remove circulating fluid from the annulus of the segment, the return pipe being positioned at a second end of the annulus of the segment of the pipe, the return pipe being in fluid communication with the annulus via an outlet point.

Optionally, the outlet point is located on a first connector at the first end of the segment of the pipe.

Optionally, the inlet point is located on a second connector at the second end of the segment of the pipe.

Optionally, the system is configured to allow fluid communication between the annular spaces of two adjacent segments.

Optionally, the system further comprises, between adjacent segments of the pipe, an annulus valve configured to allow fluid communication to be closed between the annular spaces of the two adjacent segments.

Optionally, the segments are configured such that fluid communication between the annular spaces of two adjacent segments is not possible.

Optionally, each segment comprises, at each end, a connector, and wherein adjacent segments are coupled to each other via the connectors.

Optionally, the system comprises at least two injector pipes and at least two return pipes for each segment of the pipe.

Optionally, a first injector pipe and return pipe are a main set of injector and return pipes and a second injector pipe and return pipe are a reserve set of injector and return pipes.

Optionally, the system additionally comprises at least one sampler configured to receive recirculated fluid returned from inside the annulus.

According to a second aspect of the invention, there is provided a method of forcing circulation of fluids through an annulus between an inner barrier and an outer cover of a pipe, the pipe being subdivided into at least two segments joined together by means of at least one connector, wherein the method comprises one or more of the steps of: for each segment, injecting circulating fluid substantially at a first end of the annulus of the segment of the pipe through an injector pipe, the injector pipe being in fluid communication with the annulus of the segment via an inlet point; and for each segment, removing circulating fluid from the annulus of the segment through a return pipe, the return pipe being positioned substantially at a second end of the annulus of the segment of the pipe, the return pipe being in fluid communication with the annulus via an outlet point.

Optionally, the method further comprises, in a return pipe in communication with a segment that has lost integrity through damage to a region of the outer cover, flowing fluid in the opposite direction to the step of removing, so as the return pipe functions as an injector pipe to promote the removal or the reduction of any corrosive fluids in the annulus to the exterior of the annulus of the segment via the damaged region of its outer cover.

Optionally, the method further comprises the step of allowing fluid communication between the annular spaces of two adjacent segments.

Optionally, the method further comprises a step of closing fluid communication between the annular spaces of two adjacent segments by means of an annulus valve.

Optionally, the method further comprises the additional step of preventing fluid communication between the annular spaces of two adjacent segments.

Optionally, the method further comprises the step of directing the recirculated fluid that comes from inside the annulus to at least one sampler.

According to a second aspect of the invention, there is provided a method of detecting a leak in an annulus between an inner barrier and an outer cover of a pipe, the pipe being subdivided into at least two segments joined together by means of at least one connector, wherein the method detects the segment of the pipe in which the leak is present, and wherein each segment is provided with injector and return pipes for circulating fluid through the segment, the method comprising one or more of the steps of: for each segment, changing the pressure within the annulus utilising the injector and return pipes; monitoring the response to the pressure change in each segment and determining if the response is indicative of a leak.

Optionally, changing the pressure involves pressurising the segment via the return pipes or performing a vacuum test.

Optionally monitoring the response to the pressure change in each segment and determining whether the response is indicative of a leak comprises one or more of measuring the pressure in an injection line, visually identifying a gas leakage, or monitoring a local pressure level in the annulus of each segment.

According to another aspect, there is provided a system for forced circulation of fluids through the annulus of a flexible pipe, the flexible pipe being subdivided into at least two segments joined together by means of at least one pair of connectors, said system comprising (i) at least one injector pipe suitable for injecting circulating fluid at a first end of the annulus of a specified segment of the flexible pipe, this injector pipe being in fluid communication with the annulus of this segment via at least one inlet point, (ii) at least one return pipe suitable for removing circulating fluid from the annulus of this same segment, this return pipe being positioned at a second end of the annulus, opposite the first, of this segment of the flexible pipe, and this return pipe being in fluid communication with the annulus via at least one outlet point, in which at least one injector pipe and at least one return pipe are provided for each segment of the flexible pipe.

There is also provided a method for forced circulation of fluids through the annulus of a flexible pipe, the flexible pipe being subdivided into at least two segments joined together by means of at least one pair of connectors, said method comprising the steps of (i) injecting circulating fluid at a first end of the annulus of a specified segment of the flexible pipe through at least one injector pipe, this injector pipe being in fluid communication with the annulus of this segment via at least one inlet point, and (ii) removing circulating fluid from the annulus of this same segment through at least one return pipe, this return pipe being positioned at a second end of the annulus, opposite the first, of this segment of the flexible pipe, this return pipe being in fluid communication with the annulus via at least one outlet point, in which at least one injector pipe and at least one return pipe are provided for each segment of the flexible pipe.

According to another aspect of the invention, there is provided a system for forced circulation of fluids through the annulus A of a flexible pipe 10, the flexible pipe 10 being subdivided into at least two segments T1, T2, T3, TN joined together by means of at least one connector C1a, C1b, C2a, C2b, C3a, C3b, characterized in that it comprises: at least one injector pipe I1, I2, I3, IN suitable for injecting circulating fluid 30 substantially at a first end of the annulus A of a specified segment T1, T2, T3, TN of the flexible pipe 10, at least one injector pipe I1, I2, I3, IN being in fluid communication with the annulus A of this segment T1, T2, T3, TN via at least one inlet point IP, which is preferably located at the end of the segment farthest from the offshore facility; and at least one return pipe R1, R2, R3, RN suitable for removing circulating fluid 30 from the annulus A of this same segment T1, T2, T3, TN, at least one return pipe R1, R2, R3, RN being positioned at a second end of the annulus A, opposite the first, of this segment T1, T2, T3, TN of the flexible pipe 10, the at least one return pipe R1, R2, R3, RN being in fluid communication with the annulus A via at least one outlet point OP, which is preferably located at the end of the segment farthest from the offshore facility; in which at least one injector pipe I1, I2, I3, IN and at least one return pipe R1, R2, R3, RN are provided for each segment T1, T2, T3, TN of the flexible pipe 10.

Optionally, the at least one outlet point OP is located on a first connector C1a, C2a, C3a at a first end of the segment T1, T2, T3, TN of the flexible pipe 10.

Optionally, at least one inlet point IP is located on a second connector C1b, C2b, C3b at a second end of the segment T1, T2, T3, TN of the flexible pipe 10, opposite the first.

Optionally, the system allows fluid communication between the annular spaces of two adjacent segments T1-T2, T2-T3.

Optionally, the fluid communication between the annular spaces of two adjacent segments T1-T2, T2-T3 can be closed by means of at least one annulus valve.

Optionally, the system comprises absence of fluid communication between the annular spaces of two adjacent segments T1-T2, T2-T3.

Optionally, each segment T1, T2, T3, TN comprises, at each of their ends, a connector C1b, C2b that is coupled to another connector C2a, C3a positioned at one end of an adjacent segment T1-T2, T2-T3.

Optionally, the system comprises at least two injector pipes and at least two return pipes for each segment T1, T2, T3, TN of the flexible pipe, namely a first main set of injector and return pipes and a second reserve set of injector and return pipes.

Optionally, the system additionally comprises at least one sampler 40 suitable for receiving recirculated fluid that comes from inside the annulus A.

According to another aspect of the invention there is provided a method for forced circulation of fluids through the annulus A of a flexible pipe 10, the flexible pipe 10 being subdivided into at least two segments T1, T2, T3, TN joined together by means of at least one pair of connectors C1a, C1b, C2a, C2b, C3a, C3b, characterized in that it comprises the steps of: injecting circulating fluid 30 substantially at a first end of the annulus A of a specified segment T1, T2, T3, TN of the flexible pipe 10 through at least one injector pipe I1, I2, I3, IN, at least one injector pipe I1, I2, I3, IN being in fluid communication with the annulus A of this segment T1, T2, T3, TN via at least one inlet point IP; and removing circulating fluid 30 from the annulus A of this same segment T1, T2, T3, TN through at least one return pipe R1, R2, R3, RN, at least one return pipe R1, R2, R3, RN being positioned substantially at a second end of the annulus A, opposite the first, of this segment T1, T2, T3, TN of the flexible pipe 10, at least one return pipe R1, R2, R3, RN being in fluid communication with the annulus A via at least one outlet point OP, in that at least one injector pipe I1, I2, I3, IN and at least one return pipe R1, R2, R3, RN are provided for each segment T1, T2, T3, TN of the flexible pipe 10, in that at least one return pipe R1, R2, R3, RN is used as injector pipe for the purpose of allowing flow in opposite directions, besides the regular flow by means of at least one injector pipe I1, I2, I3, IN, in the segment annulus that has lost its integrity, promoting the removal or the reduction of the content of corrosive fluids to the exterior of the annulus of the segment via the damaged region of its outer cover.

Optionally, the method additionally comprises the step of allowing fluid communication between the annular spaces of two adjacent segments T1, T2, T3, TN.

Optionally, the fluid communication between the annular spaces A of two adjacent segments T1, T2, T3, TN can be closed by means of at least one annulus valve.

Optionally, the method comprises the additional step of preventing fluid communication between the annular spaces of two adjacent segments T1-T2, T2-T3.

Optionally, the method comprises the additional step of directing the recirculated fluid that comes from inside the annulus A to at least one sampler 40.

BRIEF DESCRIPTION OF THE FIGURES

The detailed description presented hereunder refers to the appended figures and their respective reference numbers.

DETAILED DESCRIPTION OF THE INVENTION

First, it is emphasized that the following description will be based on a preferred embodiment. As will be obvious to a person skilled in the art, however, the invention is not limited to this particular embodiment.

Figure 1:
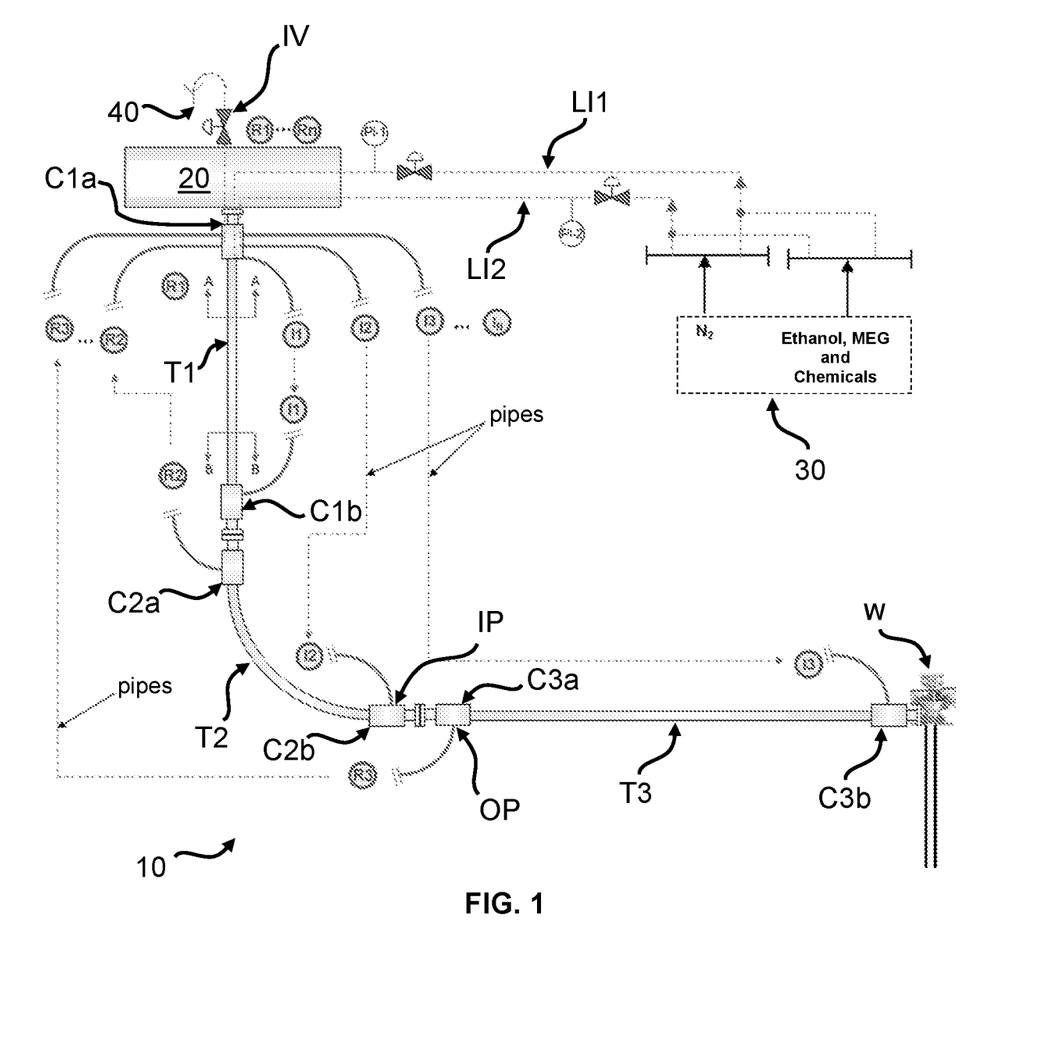
FIG. 1 shows a schematic diagram of a piping system.
Figure 2:
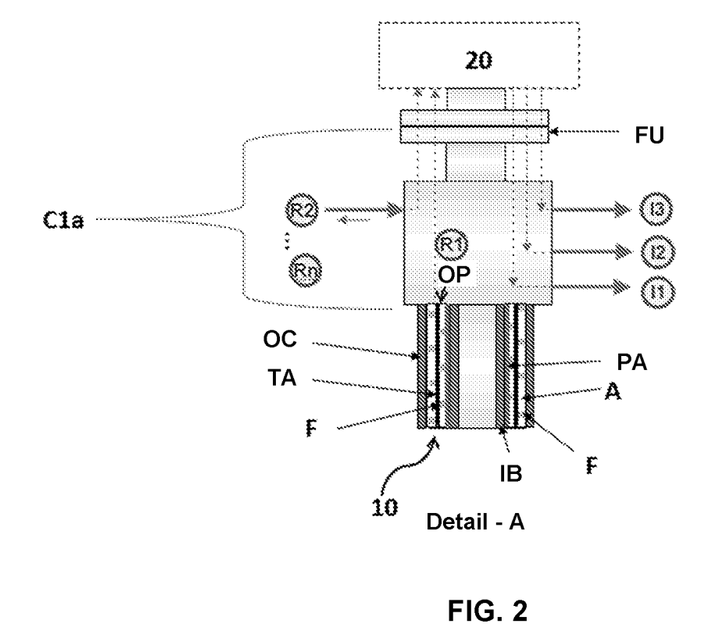
FIG. 2 shows a detail A of the schematic diagram presented in FIG. 1.
Figure 3:
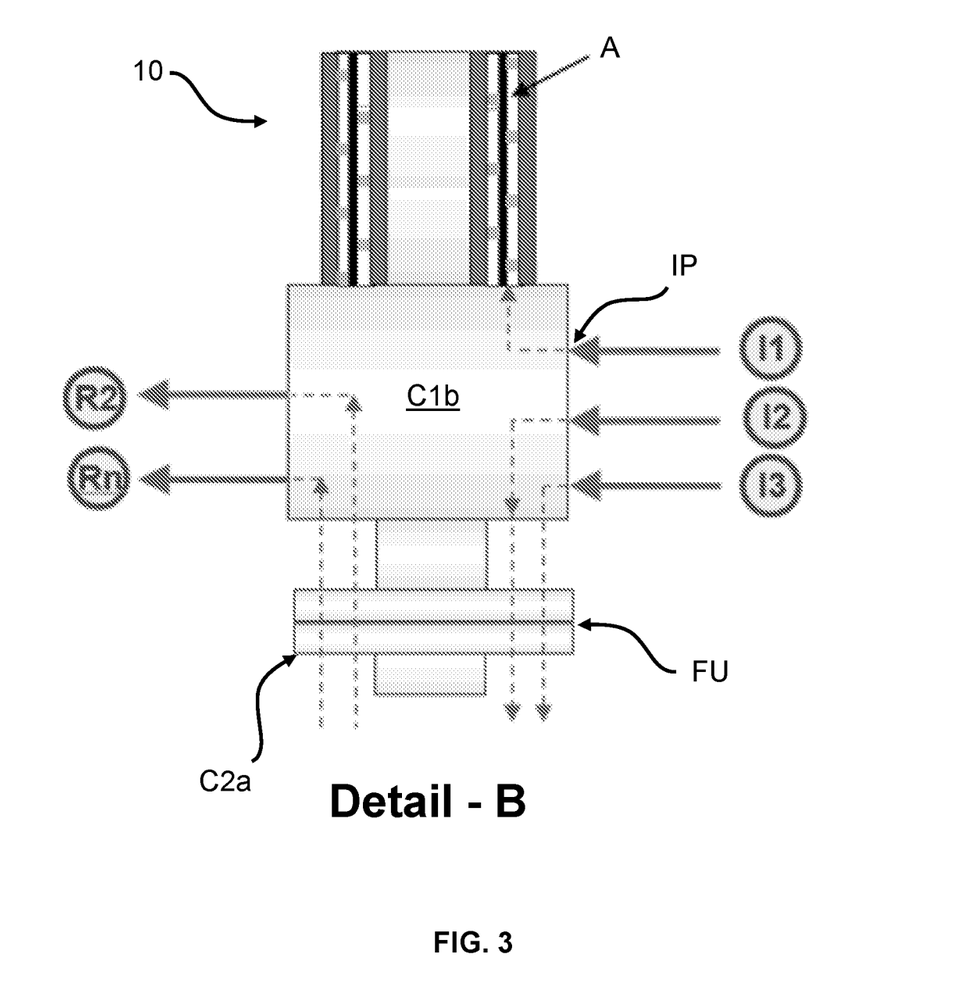
FIG. 3 shows a detail B of the schematic diagram presented in FIG. 1.

FIG. 1 shows a schematic diagram of a system according to a preferred embodiment. FIGS. 2 and 3 show, respectively, a detail A and a detail B of the schematic diagram presented in FIG. 1.

As can be seen, the system for forced circulation of fluids is applied in a flexible pipe 10 subdivided into at least two segments T1, T2, T3, TN. The segments T1, T2, T3, TN are connected to the offshore facility, to one another or to the underwater equipment by means of pairs of connectors (i.e. a connector provided at each end of the two ends of a segment). As shown in FIG. 1, there will be at least one pair of connectors C1a, C1b; C2a, C2b; C3a, C3b. In the embodiment illustrated in FIG. 1, the flexible pipe 10 comprises three segments T1, T2, T3, and thus three pairs of connectors.

As can be seen, the first segment T1 is connected via its upper connector C1a to an offshore facility 20. The offshore facility 20 can be a floating facility. The offshore facility 20 can be a Stationary Production Unit (SPU).

The lower connector C1b of the first segment T1 is coupled to the upper connector C2a of the second segment T2. Similarly, the lower connector C2b of the second segment T2 is coupled to the upper connector C3a of the third segment T3. In a pipe with more segments than shown in FIG. 1, these connections continue successively up to the nth segment TN of the flexible pipe 10. The last segment of the flexible pipe (T3 in FIG. 1) is preferably coupled to at least one underwater equipment, for example a manifold, a wet Christmas tree, a rigid pipeline or a subsea well W.

The system for forced circulation of fluids through the annulus of the flexible pipe 10 (i.e. through the space between the internal barrier and the outer cover), can comprise at least one injector pipe I1, I2, I3, IN, preferably at least one injector pipe per segment. The injector pipes I1, I2, I3, IN are suitable for injecting circulating fluid 30 at a first end of the annulus A of a specified segment T1, T2, T3, TN of the flexible pipe 10. Thus, the injector pipes I1, I2, I3, IN are in fluid communication with the annulus A of this specified segments T1, T2, T3, TN respectively, via at least one inlet point IP.

The annulus A is defined as the space between the inner polymer barrier IB and the outer polymer cover OC, as illustrated in FIG. 2. The tensile armour TA spaced from the pressure armour PA or from the outer polymer cover OC by at least one tape F, is positioned inside the annulus.

The system for forced circulation of fluids through the annulus of the flexible pipe 10, can also comprise at least one return pipe R1, R2, R3, RN suitable for removing circulating fluid 30 from the same segment T1, T2, T3, TN where there was injection via the injector pipe I1, I2, I3, IN. The return pipe R1, R2, R3, RN is positioned at a second end of the annulus A, opposite the first, of the same segment T1, T2, T3, TN of the flexible pipe 10. The return pipe R1, R2, R3, RN can be in fluid communication with the annulus A via at least one outlet point OP.

In other words, a given segment TN may have an inlet point IP, connected to an injector pipe IN, provided at one end of the segment and an outlet point OP, connected to a return pipe RN, provided at the other, opposite, end of the segment.

Taking segment T1 as an example, an injector pipe I1 injects circulating fluid 30 into the annulus A of this segment via an inlet point IP positioned at one end of the segment T1. The inlet point IP can be located on one of the connectors of segment T1 of the flexible pipe 10. In the embodiment of FIG. 1, the inlet point IP is located on the lower connector C1b of segment T1 of the flexible pipe 10.

Once circulating fluid has been injected into the annulus A of the segment T1 via the inlet point IP, the fluid will travel the entire length of the segment T1 up to the opposite end, where the upper connector C1a is positioned. The outlet point OP is located at this opposite end of this segment T1 to the inlet point IP. The outlet point OP is in fluid communication with the annulus A and the respective return pipe R1. The return pipe R1 delivers the circulated fluid back to the offshore facility 20.

In the arrangement shown, the circulating fluid injected into the annulus A will have an ascending flow in the riser sections through the annulus A.

As shown, the outlet point OP is positioned in a position closer to the offshore facility 20 relative to the inlet point IP. In this way, the flow inside the annulus A will be towards the offshore facility 20. Alternatively, the outlet point OP can be positioned farther from the offshore facility 20 relative to the inlet point IP. In this way, the flow inside the annulus A will be from the offshore facility 20 to the well W.

The outlet point OP can be located on a first connector C1a, C2a, C3a at a first end of the segment T1, T2, T3 of the flexible pipe 10. The outlet point OP can be located on a second connector C1b, C2b, C3b at a second end of the segment T1, T2, T3 of the flexible pipe 10. As a result, the circulated fluid does not all flow the whole length of the flexible pipe 10, to be returned through the annulus at the end of the flexible pipe 10 (e.g. to the offshore facility 20). Instead, circulated fluid leaves the annulus of the flexible pipe 10 at outlet points from each segment, and that fluid is then communicated back (e.g. to the offshore facility 20) by return pipes that are different to the annulus of the flexible pipe 10. For the segment closest to the return end (e.g. closest to the offshore facility 20), that return pipe may be built into the final connector C1a.

The at least one inlet point IP and at least one outlet point OP can be configured to be ports that distribute axisymmetrically what is taken from the injector pipes I1, I2, I3, IN and returned to return pipes R1, R2, R3, RN in each of the connectors C1a, C1b, C2a, C2b, C3a, C3b. The inlet and outlet ports can be interconnected to allow forced injection of circulating fluids in annulus A of the flexible pipe 10.

The fluid that has circulated inside the annulus A carries with it, back to the offshore facility 20, corrosive gases such as $CO_2$ and $H_2S$, and water that has permeated from inside the flexible pipe through the inner polymer barrier IB. This prevents corrosion of the tensile armour TA and of the pressure armour PA positioned inside the annulus A, by avoiding the build up of corrosive chemicals in the annulus A.

The circulating fluid 30 can be selected from the group consisting of inert gas (for example, $N_2$), non-corrosive gases (for example, $CH_4$) and liquids for conditioning the annulus (for example, ethanol, MEG or chemicals). Optionally, the circulating fluid 30 may be a combination of at least two of the aforementioned fluids. It is emphasized, however, that a person skilled in the art will be able to determine the best fluid to be used, so that said selection does not represent a limitation to the scope of protection of the present invention.

The same subsystem described for segment T1 is preferably also provided for each of the segments T2 to TN. Accordingly, each segment has an injection system and return of circulating fluid independent of the other segments.

Optionally, all the return pipes R1, R2, R3, RN are combined into a single return line. This combination can occur on arrival at the offshore facility 20. This reduces the number of lines in the offshore facility and simplifies the system.

Optionally, recirculation of gas by means of the injector pipes I1, I2, I3, IN and the return pipes R1, R2, R3, RN makes it possible to guarantee evaporation of the molecules of $H_2O$ that have permeated from inside the flexible pipe, including molecules captured in the interstices of the tensile armour and pressure armour or in layers below this, preventing condensation or saturation and consequent appearance of aqueous phase (condensed water), which constitutes a necessary condition for the corrosive process.

The return pipes R1, R2, R3, RN still allow sampling of fluid present in the annulus of each segment by directing this fluid to a sampler 40, as illustrated in FIG. 1. In this scenario, an isolating valve IV may be opened or closed for directing the recirculated fluid into the sampler 40 or to treatment and/or disposal.

Alternatively, the return pipes R1, R2, R3, RN may operate as injectors of recirculating fluid, optionally shared by all the segments. That is, the return pipes may be operated in reverse to their usual operation, to supply fluid to the segments. This may be desirable, for example, if there is loss of integrity of the annulus. That is, in a scenario of a damaged outer cover of a segment, by pumping circulation fluid to the segment through both the injector and return pipes, the removal or the reduction of any corrosive fluids in the annulus to the exterior of the annulus of the segment via the damaged region can be promoted. This will minimise further damage to the segment (and potentially the rest of the pipe, if the annuli of adjacent segments are in fluid communication) until it can be repaired.

The present system further envisages the possibility of individualized leak testing of the annulus of each segment T1, T2, T3, TN. The test consists of pressurizing the annulus of each segment T1, T2, T3, TN and detecting any pressure drop due to lack of integrity of the respective annulus. Such pressurization and testing could be performed on an individual segment or a subset of segments. Alternatively, pressurization may be carried out on the entire flexible pipe 10, by pressurizing all the segments simultaneously via the return pipes R1, R2, R3, RN or the injector pipes I1, I2, I3, IN, for example. Alternatively, the integrity of the annulus may be tested by means of a vacuum test—similar to the test specified in Section 9.6.2 of API Spec 17J-4th Edition—by access to the annular spaces of the segments via injector pipes I1, I2, I3, IN and injection lines LI1, LI2 or return pipes R1, R2, R3, RN taken from the line near the sampler 40.

Identification of a defective segment may be effected by measuring the pressure by means of at least one pressure sensor PI-1, PI-2 positioned in the injection lines LI1, LI2. Injections lines LI1, LI2 may be arranged such that the first injection line LI1 supplies the injector pipe I1 of the first segment T1, whereas the second injection line LI2 supplies all the other injector pipes I2, I3, IN of the other segments T2, T3, TN of the flexible pipe 10. Alternatively (not shown), there is an injection line for each of the injector pipes I1, I2, I3, IN.

Identification of the defective segment in the leak test may also be carried out by the following techniques: (i) visual indication of gas leakage (via ROV, for example); (ii) visual indication of the local pressure level of the annulus A of the segment T1, T2, T3, TN; or (iii) via pressure test or vacuum test by the offshore facility 20.

Optionally, fluid communication between the annular spaces of two adjacent segments is permitted. Fluid communication between the annular spaces of two adjacent segments can be closed by at least one annulus valve (not shown). In this way, it is possible to choose between allowing or not allowing communication between the annular spaces A of the different segments T1, T2, T3, TN of the flexible pipe 10.

Alternatively, fluid communication between the annular spaces A of the different segments T1, T2, T3, TN of the flexible pipe 10 is not permitted. That is, the system may not even allow for the possibility of fluid communication between the annular spaces A of the different segments T1, T2, T3, TN.

Each segment T1, T2, T3, TN comprises at each end a connector C1a, C1b, C2a, C2b, C3a, C3b. Within the flexible pipe 10, each connector C1b, C2a, C2b, C3a is coupled to another connector C1b, C2a, C2b, C3a positioned at one end of an adjacent segment T1, T2, T3, TN. At the ends of the flexible pipe 10, each connector C1a, C3b is coupled to the surrounding equipment—i.e. offshore facility 20 or well W. Each connector C1a, C1b, C2a, C2b, C3a, C3c can coupled to the adjacent equipment (be that another connector C1b, C2a, C2b, C3a or the offshore facility 20 or well W) via a flanged union FU, illustrated in FIGS. 2 and 3.

To ensure robustness of the solution, a reserve injection pipe and a reserve return pipe (not shown) can be interconnected in each segment T1, T2, T3, TN, via the interconnection channels that exist in the connector and the valves (retention and/or pressure control). The reserve pipes can come into service if a fault is detected in the main pipe or there is loss of integrity of the annulus of any segment of pipeline.

To prevent flooding of the annulus A, if the pipe (injector or return pipe) has been damaged in the installation, this can be isolated by means of at least one blocking valve (not shown) actuated by ROV, for example, which may only be opened after confirmation of hermeticity and integrity of the pipe, before commencement of operation of the flexible pipe. Another option for the return pipes is installation of a one-way valve (check valve), without the need for the operation of opening by ROV. The blocking valves or check valves can be installed in the connectors.

To ensure robustness of the solution, at least one reserve injection pipe and at least one reserve return pipe (not shown) are interconnected in each segment T1, T2, T3, TN, via the interconnection channels that exist in the connector C1a, C1b, C2a, C2b, C3a, C3b and valves (retention and/or pressure control). The reserve pipes can come into operation if a fault is detected in the main pipe or loss of integrity of the annulus A of any segment of the flexible pipe 10.

Accordingly, the present system may comprise at least two injector pipes and at least two return pipes for each segment T1, T2, T3, TN of the flexible pipe 10, i.e. a first main set of injector and return pipes and a second reserve set of injector and return pipes.

The present disclosure further provides a method for forced circulation of fluids through the annulus A of the flexible pipe 10 as described above. The method can comprise one or more of the following steps:

(a) injecting circulating fluid 30 substantially at a first end of the annulus A of a specified segment T1, T2, T3, TN of the flexible pipe 10 through at least one injector pipe I1, I2, I3, IN, the at least one injector pipe I1, I2, I3, IN being in fluid communication with the annulus A of this segment T1, T2, T3, TN via at least one inlet point IP;

(b) removing circulating fluid 30 from the annulus A of this same segment T1, T2, T3, TN through at least one return pipe R1, R2, R3, RN, the at least one return pipe R1, R2, R3, RN being positioned at a second end of the annulus A, opposite the first, of this segment T1, T2, T3, TN of the flexible pipe 10, the at least one return pipe R1, R2, R3, RN being in fluid communication with the annulus A via at least one outlet point OP, (c) in which at least one injector pipe I1, I2, I3, IN and at least one return pipe R1, R2, R3, RN are provided for each segment T1, T2, T3, TN of the flexible pipe 10.

Optionally, the method comprises the step of allowing fluid communication between the annular spaces A of two adjacent segments T1, T2, T3, TN. In this case, optionally, fluid communication between the annular spaces A of two adjacent segments T1, T2, T3, TN can be closed by means of at least one annulus valve (not shown).

Alternatively, the method comprises the step of not allowing fluid communication between the annular spaces A of two adjacent segments T1, T2, T3, TN. Thus, only the injector pipes and return pipes of this specific segment T1, T2, T3, TN circulate the circulating fluid 30 through the annulus A.

Optionally, the method additionally comprises the step of directing recirculated fluid that comes from inside the annulus A to at least one sampler 40.

Thus, the present disclosure provides a system and a method for forced circulation of fluids through the annulus of a flexible pipe capable of efficiently removing any corrosive fluids that have accumulated in the annulus of the flexible pipe, as well as circulating fluids inside each segment of the flexible pipe independently of the others. In addition, the system allows individualized leak testing in each segment of the flexible pipe, allowing damaged sections to be detected. In addition, the disclosure envisages injection of inert fluids for removing corrosive agents from the annulus or fluids for maintenance of the tensile armour and pressure armour inside the annulus. Finally, the system allows sampling of fluids present inside the annulus for subsequent analysis of the quality thereof.

Countless variations falling within the scope of protection of the present application are permitted. This reinforces the fact that the present invention is not limited to the particular configurations/embodiments described above. As such, modifications of the above-described apparatuses and methods, combinations between different variations as practicable, and variations of aspects of the invention that are obvious to those of skill in the art are intended to be within the spirit and scope of the claims.

The invention claimed is:

1. A system configured to force circulation of fluids through an annulus between an inner barrier and an outer cover of a pipe, the pipe configured to convey a produced fluid and being subdivided into at least two segments joined together by means of at least one connector, wherein the system comprises:

for each segment of the pipe, an injector pipe configured to inject a circulating fluid substantially at a first end of the annulus of the segment of the pipe, the injector pipe being in fluid communication with the annulus of the segment via an inlet point; and for each segment of the pipe, a return pipe configured to remove the circulating fluid from the annulus of the segment, the return pipe being positioned at a second end of the annulus of the segment of the pipe, the return pipe being in fluid communication with the annulus via an outlet point, wherein each segment comprises a first connector at the first end of the segment of the pipe and a second connector at the second end of the segment of the pipe and where the inlet point is located on the first connector and the outlet point is located on the second connector, and wherein the circulating fluid is a different fluid than the produced fluid.

2. The system according to claim 1, wherein the system is configured to allow fluid communication between the annuli of two adjacent segments.

3. The system according to claim 1, further comprising, between adjacent segments of the pipe, an annulus valve configured to allow fluid communication to be closed between the annuli of the two adjacent segments.

4. The system according to claim 1, wherein the segments are configured such that fluid communication between the annuli of two adjacent segments is not possible.

5. The system according to claim 1, wherein adjacent segments are coupled to each other via the first and second connectors.

6. The system according to claim 1, wherein the system comprises at least two injector pipes and at least two return pipes for each segment of the pipe.

7. The system according to claim 6, wherein a first injector pipe and return pipe are a main set of injector and return pipes and a second injector pipe and return pipe are a reserve set of injector and return pipes.

8. The system according to claim 1, wherein the system additionally comprises at least one sampler configured to receive recirculated fluid returned from inside the annulus.

9. A method of forcing circulation of fluids through an annulus between an inner barrier and an outer cover of a pipe, the pipe being subdivided into at least two segments joined together by means of at least one connector, wherein the method comprises the steps of:

for each segment, injecting a pressurized circulating fluid substantially at a first end of the annulus of the segment of the pipe through an injector pipe, the injector pipe being in fluid communication with the annulus of the segment via an inlet point, where the inlet point is located on a first connector at the first end of the segment of the pipe; and for each segment, removing the pressurized circulating fluid from the annulus of the segment through a return pipe, the return pipe being positioned substantially at a second end of the annulus of the segment of the pipe, the return pipe being in fluid communication with the annulus via an outlet point, where the outlet point is located on a second connector at the second end of the segment of the pipe.

10. The method according to claim 9, further comprising, in a return pipe in communication with a segment that has lost integrity through damage to a region of the outer cover, flowing fluid in the opposite direction to the step of removing, so as the return pipe functions as an injector pipe to promote the removal or the reduction of any corrosive fluids in the annulus to the exterior of the annulus of the segment via the damaged region of its outer cover.

11. The method according to claim 9, further comprising a step of allowing fluid communication between the annuli of two adjacent segments.

12. The method according to claim 9, further comprising a step of closing fluid communication between the annuli of two adjacent segments by means of an annulus valve.

13. The method according to claim 9, further comprising an additional step of preventing fluid communication between the annuli of two adjacent segments.

14. The method according to claim 9, further comprising a step of directing the recirculated fluid that comes from inside the annulus to at least one sampler.

15. A method of detecting a leak in an annulus between an inner barrier and an outer cover of a pipe, the pipe being subdivided into at least two segments joined together by means of at least one connector, wherein the method detects the segment of the pipe in which the leak is present, and wherein each segment is provided with injector and return pipes for forced circulation of a circulating fluid through the annulus of the segment, the method comprising the steps of:

for each segment, changing the pressure within the annulus utilizing the injector and return pipes by adjusting a flow of the circulating fluid, the circulating fluid being a fluid different from a fluid flowing within the inner barrier of the pipe; and monitoring the response to the pressure change in each segment and determining if the response is indicative of a leak.

16. The method according to claim 15, wherein changing the pressure involves pressurizing the segment via the return pipes or performing a vacuum test.

17. The method according to claim 15, wherein monitoring the response to the pressure change in each segment and determining whether the response is indicative of a leak comprises one or more of measuring the pressure in an injection line, visually identifying a gas leakage, or monitoring a local pressure level in the annulus of each segment.

18. The method according to claim 15, further comprising, for each segment, returning the fluid inside the annulus back to an offshore facility along with corrosive gases from within the annulus that permeated the inner barrier.

19. The method according to claim 15, wherein the pipe comprises a layer of armor disposed in the annulus between the inner barrier and the outer cover.

20. The method according to claim 15, wherein the changing the pressure within the annulus utilizing the injector and return pipes comprises flowing the fluid from the injector pipe at a first end of the annulus of each segment to the return pipe at a second end of the annulus of each segment.

* * * * *